United States Patent [19] [11] 4,043,879
Levinos [45] Aug. 23, 1977

[54] ELECTROLYTICALLY INDUCED POLYMERIZATION UTILIZING BISULFITE ADDUCT FREE RADICAL PRECURSOR

[75] Inventor: Steven Levinos, Chatham, N.J.

[73] Assignee: Keuffel & Esser Company, Morristown, N.J.

[21] Appl. No.: 719,539

[22] Filed: Sept. 1, 1976

Related U.S. Application Data

[62] Division of Ser. No. 273,903, July 21, 1972, Pat. No. 4,012,295.

[51] Int. Cl.$^2$ .......................... B44C 1/04; C25B 3/00
[52] U.S. Cl. .................................. 204/18 PC; 204/72
[58] Field of Search ................ 204/14 N, 18 PC, 72, 204/73

[56] References Cited

U.S. PATENT DOCUMENTS

| | | | |
|---|---|---|---|
| 3,409,431 | 11/1968 | Deutsch | 204/18 PC |
| 3,427,234 | 2/1969 | Guthke et al. | 204/73 A |
| 3,573,180 | 3/1971 | Hodes et al. | 204/72 |
| 3,677,911 | 7/1972 | Mothus et al. | 204/592 M |
| 3,875,025 | 4/1975 | Hodes et al. | 204/18 PC |
| 3,909,255 | 9/1975 | Levinos | 204/18 PC |
| 3,954,462 | 5/1976 | Levinos | 204/18 PC |

*Primary Examiner*—T. M. Tufariello
*Attorney, Agent, or Firm*—Lionel N. White

[57] ABSTRACT

Polymerization of an ethylenically unsaturated compound is achieved by means of free radical initiators derived from the reaction of an aldehyde/bisulfite adduct with cupric ions resulting from electrolysis involving a copper anode. By including a photoconductive cathode in the system image-wise light exposure effects the formation of polymeric images in the polymerizable composition.

3 Claims, No Drawings

ELECTROLYTICALLY INDUCED POLYMERIZATION UTILIZING BISULFITE ADDUCT FREE RADICAL PRECURSOR

This application is a division of co-pending application Ser. No. 273,903, filed July 21, 1972 now U.S. Pat. No. 4,012,295.

BACKGROUND

Photoconductive layers have long been employed as a means for obtaining from a limited light exposure an image-wise pattern of conductivity which can be utilized in a number of electrolytic processes for generating visible, high-contrast, substanitally permanent graphic images. Such photoconductive layers have thus been employed, for example, in imaging methods which entail electrolytically-induced polymerization, such as described in U.S. Pat. No. 3,436,215.

The present invention similarly involves electropolymerization of ethylenically unsaturated compounds, such as vinyl monomers, and in this respect is sufficiently closely related to the subject matter of the above-referenced patent that the disclosures and dicussions there, particularly with respect to polymerizable monmers and photoconductive materials per se, will provide a significant and substantial description of the basis of the present invention.

The invention described in U.S. Pat. No. 3,436,215 is limited, for the most part, to a concomitant light exposure of a photoconductive cathode and applied DC voltage. In this regard, the prior procedure required a duration of light exposure determined by the polymerization rate of the particular composition empolyed. The present invention, on the other hand, is capable of generating polymeric images independently of the duration of light exposure, since, as will later be described, the procedure involves the use of a self-sustaining reaction for the generation of polymerization-inducing free-radical species, which reaction when once initiated by the electrolytic injection of metallic ions can proceed to completion without further photo-induced electrolysis.

SUMMARY

In accordance with the present invention, a conductive support having a surface of copper, or a copper-containing alloy, it coated with a layer of composition comprising a polymerizable vinyl monomer and an alderhyd/bisulfite adduct (addition product). Combining the resulting sheet material in the usual manner with a cathode comprising a photoconductive layer, such as zinc oxide in a resin binder, on a substantially transparent conductive support, and a source of electric current, yields a system of potential electrolysis which can be activated by exposure of the photoconductor to light in the form of the image to be reproduced.

As a result of such illumination, and thus the completion of an electrical circuit in the system, electric current causes the electrolytic injection of cupric ions from the copper-containing anode into the monomer-containing imaging sheet composition where the ions react with the aldehyde/bisulfite adduct to produce free-radical polymerization-initiating catalyst species.

The free-radical generating reaction components apparently include contained or available oxygen, and the rate of the polymerization reaction is thereby enhanced by the presence of this element rather than inhibited by it during an oxygen-eliminating induction period associated with numerous other polymerization processes.

The image-wise formation of polymer of the surface of a copper anode finds particular utility in the preparation of printing plates and electronic component circuit boards where, for example, after removal of the unpolymerized composition, the remaining polymer image serves as a resist in common etching procedures.

DESCRIPTION

Polymerizable compound, photoconductor materials, conductive substrates, binder resins, coating procedures, and the like described in U.S. Pat. No. 3,436,215 may likewise be used in the present invention. The numerous acrylic and other polymerizable vinyl compounds and monomers suggested there, and elsewhere in the art, as well as the many noted cross-linking agents, may be similarly employed in the preparation of the present polymerizable compositions.

Coating adjuncts may likewise be employed, as desired. For example, natural or synthetic film formers such as gelatin, polyvinyl alcohol, carboxymethyl cellulose, and the like may be employed. The use of such binders serves the usual purpose of maintaining homogeneity in the coating, with gelatin, in particular, providing an additional advantage by virtue of its capability of becoming involved in the formation of graft polymer and thus extending the resulting polymerization product.

Other components of the present system which are common to electropolymerization systems, for example, the photoconductor layer and its substantially transparent base, may be any of the many types previously cited. Any of the numerous photoactive cathode components may be employed with equally good results.

It will thus be apparent that the substance of the present invention resides in the combination of the precursor of polymerization-initiating free-radical species and the copper or copper-containing anode support for the polymerizable composition. The support which provides a source of cupric ions may be in the form of a plate or foil of copper or may comprise a base metal plated with a layer of copper. Similarly, copper-containing alloys may be employed as a source of the electrolytically generated cupric ions.

The aldehyde/bisulfite adduct component of the free-radical species precursor combination may be any of the many readily prepared adducts formed as addition products of, for example, sodium bisulfite and an aromatic or aliphatic aldehyde, such as formaldehyde, acetaldehyde, or glutaraldehyde.

Perparation of the polymerizable composition and the imaging material comprising a layer of such composition follows the procedures common to the art, and includes the co-solution, dispersion, or other intimate combination of the monomer with the aldehyde/bisulfite adduct, and such other adjuncts, as binder, cross-linking agents, and the like, as may be desired, in sufficient fluid vehicle to impart coatable consistency. Application of such compositon to a copper-surfaced support provides a sheet material capable of being imaged in the now common photoelectrolytic polymerization process.

The distinct advantage of the material of the present invention over those imaging sheets and compositions previously available, i.e., the capability of the material to proceed to the formation of completely polymerized images even after a minimum light exposure, and thus a minimum passage of electric current, is believed to be due to the self-sustaining character of the electrochemical reaction by which polymerization-initiating free-radical species are formed, As a basis for considering the mechanism by which the present material functions to provide the noted advantage, it has been hypothesized that the following reactions occur upon the injection of cupric ions into the polymerizable composition as a result of the electrolysis initiated by the circuit-completing image-wise exposure of the assemblage previously described.

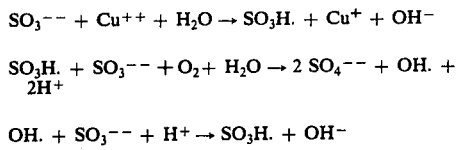

As can be seen from the illustrative reactions, cupric ions in minimal concentration, as derived from the initial electrolysis within the system upon light exposure, initiate formation of sulfonic acid free-radicals, which thereafter react to form hydroxyl free-radicals, either of which free-radicals are effective polymerization-initiating species. As can further be seen, the formation of these free-radicals continues until the ultimate consumption of available sulfite anions, or dissolved or aerial oxygen. The role of oxygen in the formation of polymerizing free-radical species results in an acceleration of the polymerization rate in the materials of the present invention, since the oxygen is here utilized in the formation of polymerization-initiating species rather than effecting the inhibition of polymerization for which oxygen has been notoriously recognized in previous systems.

The proportions of aldehyde/bisulfite adduct precursor compounds in polymerizable compositions is not critical and may generally range from about 5% by weight on the basis of the monomer compounds up to saturation with respect to the fluid vehicle of the coatable composition. In this latter respect, it has been found that the incorporation of binder adjunct exhibits a pronounced effect upon the amount of monomer and precursor materials which may be incorporated into the composition, and thus such binders may be employed not only as matrices to maintain the homogeneity of the system, but also as extenders of the compatibility of the primary components of the system. Blends of solid monomer with gelatin binder adjuncts have been found to be suitable with up to about 35% monomer content.

While the aldehyde/bisulfite adducts are substantially stable in the polymerizable compositions, the storage stability of such compositions including significant proportions of the adduct compound can be extended to a great degree by the incorporation in the composition of an alkali metal salt of o-benzaldehyde sulfonic acid in about equal proportions to that of the adduct. Although the o-benzaldehyde sulfonic acid salt is thus effective in maintaining the storage stability of the polymerizable material of the present invention, it does not exhibit deleterious effect upon or inhibit the rate of the electrolytically-induced polymerization reactions, since it participates, upon electrolytic activation, in the polymerization reaction, apparently contributing to the formation of polymerization-initiating free-radical species. It has, in fact, been observed that the o-benzaldehyde sulfonic acid salt is capable of initiating polymerization of monomers when incorporated in a monomer/copper anode electrolytic system as the sole precursor of polymerization initiating species; however, it does not appear to have the capability of the polymerization reaction in the absence of electrical current as do the aldehyde/bisulfite adduct precursors.

PREFERRED EMBODIMENTS

The electropolymerizable materials of the present invention are preferably prepared form homogeneous compositions coated on the selected copper-containing conductive substrate. Such use of molecular or colloidal solutions ensure the desirable uniform distribution of components throughout the polymerizable mass. Aqueous coating vehicles are preferred due to economy and general lack of hazard.

The following examples are representative of the procedures employed in preparing the electropolymerizable materials of the present invention and the manner of using such materials.

EXAMPLE 1

A coating composition was prepared by thoroughly dispersing the following ingredients, generally in the indicated order, in about 75 ml. of deionized water to effect dissolution and a homogeneous mixture:

| | |
|---|---|
| Gelatin (high bloom, inert) | 4.5 g. |
| Polyvinyl pyrrolidone (med. visc.) | 0.8 g. |
| Acrylamide | 2.1 g. |
| N, N'-methylenebisacrylamide | 0.4 g. |
| Sodium o-benzaldehyde sulfonate | 1.5 g. |

A solution of 1.5 g. of glutaraldehyde/sodium bisulfite adduct in 2.5 ml. of deionized water was added to the foregoing composition, and 10 ml. of ethylene glycol was finally added to complete the coatable composition.

Coatings of about 5 mils thickness were prepared on each of a sandblasted aluminum sheet, a copper-surfaced aluminum sheet, and a phosphorbronze (about 90% copper, 10% tin, and 0.2% phosphorous) sheet and allowed to dry at room temperature overnight.

A photoconductive cathode was prepared in the known manner by forming a layer of dye-sensitized zinc oxide in a matrix of hardened epoxy resin on the conductive surface of a commercially available electrically-conducting glass panel having a resistivity of about 7 ohms/sq. The layer comprised about one part of binder of 5 parts of zinc oxide sensitized with about 0.1% of a mixture of fluorescein, rose bengal, and bromphenol blue. To provide a practical measure of abrasion resistance, the photoconductive coating was overcoated with a conductive layer comprising about 1 part of carbon black in 3 parts of hardened epoxy resin matrix.

Each of the imaging materials prepared as noted above was tested in the following manner: The monomer-containing layer of the imaging sheet was placed in intimate contact with the carbon coating of the photoconductive plate and, with the metal support of the imaging sheets as anode and the conductive suface of the glass panel as cathode, these two elements were arranged in electrical circuit with a 75-volt DC potential. The glass plate panel of this assembly was then exposed to a projected 15X negative image (500-watt tungsten lamp source) for a period of about 2 to 10 seconds. The coated sheet was then removed from the assembly and the coating was washed in clear, warm water for about one minute.

An excellent resist image which could be dyed was obtained on the copper-surfaced aluminum sheet after an exposure of about 2 seconds. An exposure of about 10 seconds similarly resulted in a resist image on the phosphorbronze sheet. An exposure in excess of about 10 seconds, however, resulted in no evident image on the aluminum sheet.

It was determined that the described photoconductive cathode plate provided maximum photocurrent, at the applied potential of 75 volts, after about 2 seconds light exposure ot the source employed in the present example. Thus the excellent resist image obtained with the copper-surfaced support and the polymerizable composition of the present example resulted from a minimal amount of electrolysis and was clearly formed, for the most part, by the self-sustaining generation of polymerization-initiating free-radicals as previously described.

EXAMPLE 2

A copper-surfaced aluminum sheet, pretreated with 0.1% solution of benzotriazole to chelate surface copper ions, was coated in the manner described in Example 1 with a layer of a composition of the following formation:

| | |
|---|---|
| Deionized water | 75 ml. |
| Polyvinyl alcohol | 5 g. |
| Acrylamide | 2.1 g. |
| N, N'-methylenebisacrylamide | 0.4 g. |
| Sodium o-benzaldehyde sulfonate | 1.5 g. |
| Deionized water | 20 ml. |
| Glutaraldehyde/sodium bisulfite adduct | 1.5 g. |
| Ethylene glycol | 10 ml. |

A 5 second exposure under the conditions described in Example 1 followed by a wash treatment with clear, warm water resulted in a good quality resist image on the copper-surfaced sheet. A similar coating on an aluminum sheet resulted in a material which provided no image under the foregoing conditions.

EXAMPLE 3

A coating was prepared on a copper-surfaced sheet as in Example 2 using a composition substantially the same as the composition of Example 2, but for the substitution of 4 g. of medium viscosity polyvinyl methylether/maleic anhydride (PVM/MA) as the binder matrix in place of the polyvinyl alcohol. Light exposure and development treatment as in the foregoing examples yielded a good resist image.

EXAMPLE 4

The glutaraldehyde/sodium bisulfite adduct of Example 3 was substituted by an equal amount of acetaldehyde/bisulfite adduct to obtain a composition which provided an imaging material of equal quality to that of Example 3 when coated on the copper-surfaced sheet.

EXAMPLE 5

Results similar to those obtained in Example 3 resulted from a substitution of an equal amount of a formaldehyde/bisulfite adduct for the glutaraldehyde/bisulfite adduct of Example 3.

EXAMPLE 6

Substitution of 5 g. of polyvinyl alcohol as the binder matrix in the formulation of Example 4 provided similarly good results.

EXAMPLE 7

Substitution of 5 g. of polyvinyl alcohol as the binder matrix in the formulation of Example 5 provided similarly good results.

EXAMPLE 8

A silver-activated cadmium sulfide photoconductive layer was substituted for the zinc oxide photoconductive layer of Example 1 and provided a good resist image after an exposure of about one second. The greater photoconductivity of this cadmium sulfide layer clearly provided the more rapid development of maximum photocurrent to electrolytically initiate the injection of cupric ions into the polymerizable composition.

What is claimed is:
1. A method of forming an image which comprises:
 a. providing imaging material comprising an electrically-conductive support having a surface comprising a substantial proportion of metallic copper, said surface bearing a layer of a composition comprising:
  1. a polymerizable ethylenically unsaturated compound, and
  2. an aldehyde/bisulfite adduct;
 b. contacting the exposed surface of said layer with a cathode exhibiting a pattern of electrical conductivity corresponding to said image;
 c. arranging a source of electrical potential in circuit with said cathode and said electrically-conductive support, said support constituting the anode of the arrangement;
 d. causing electrical current to flow through said layer in accordance with said image pattern of said cathode, thereby effecting image-wise migration of cupric ions into and generation of polymerization-inducing species in said composition layer with concurrent polymerization of said polymerizable compound;
 e. separating said cathode from said composition layer; and
 f. removing unpolymerized composition from said layer.
2. A method according to claim 1 wherein said imaging material composition includes an alkali metal salt of o-benzaldehyde sulfonic acid.
3. An imaging method according to claim 1 wherein said catode comprises a layer of a photoconductive compound and said image pattern of electrical conductivity is formed in said cathode by an image-wise light exposure of said photoconductive layer.

* * * * *

UNITED STATES PATENT OFFICE
CERTIFICATE OF CORRECTION

Patent No. 4,043,879    Dated August 23, 1977

Inventor(s) Steven Levinos

It is certified that error appears in the above-identified patent and that said Letters Patent are hereby corrected as shown below:

Column 3, line 68, after "of" insert -- maintaining --.

Column 4, line 43, "7" should read -- 70 --.

Column 4, line 45, "of", first occurrence, should read -- to --.

Signed and Sealed this

First Day of November 1977

[SEAL]

Attest:

RUTH C. MASON
*Attesting Officer*

LUTRELLE F. PARKER
*Acting Commissioner of Patents and Trademarks*